US006748314B2

(12) United States Patent
Dohta

(10) Patent No.: US 6,748,314 B2
(45) Date of Patent: Jun. 8, 2004

(54) FUEL INJECTION AMOUNT CONTROL SYSTEM FOR INTERNAL COMBUSTION ENGINE

(75) Inventor: Hisayo Dohta, Chiryu (JP)

(73) Assignee: Denso Corporation, Kariya (JP)

( * ) Notice: Subject to any disclaimer, the term of this patent is extended or adjusted under 35 U.S.C. 154(b) by 184 days.

(21) Appl. No.: 10/059,406

(22) Filed: Jan. 31, 2002

(65) Prior Publication Data

US 2002/0133287 A1 Sep. 19, 2002

(30) Foreign Application Priority Data

Feb. 5, 2001 (JP) ....................................... 2001-027813

(51) Int. Cl.[7] .................................................. B60T 7/12
(52) U.S. Cl. ........................ 701/104; 123/480; 123/492
(58) Field of Search ................................ 701/104, 113, 701/115; 123/492, 478, 480, 486

(56) References Cited

U.S. PATENT DOCUMENTS 4,388,906 A * 6/1983 Sugiyama et al. .......... 123/492
4,481,928 A * 11/1984 Takimoto et al. ........... 123/492
5,408,973 A * 4/1995 Spangjer ..................... 123/478
5,611,315 A 3/1997 Dohta et al.
5,988,144 A * 11/1999 Yoshioka et al. ........... 123/493
6,073,073 A * 6/2000 Kitamura et al. ........... 701/103
6,397,830 B1 6/2002 Dohta
6,513,488 B2 * 2/2003 Enoki et al. ................ 123/305
6,568,240 B1 * 5/2003 Sato et al. .................... 73/1.07

FOREIGN PATENT DOCUMENTS

JP A-7-166923 6/1995

* cited by examiner

*Primary Examiner*—John Kwon
(74) *Attorney, Agent, or Firm*—Nixon & Vanderhye P.C.

(57) ABSTRACT

A fuel transportation lag model has a fuel transportation lag element A (FTLEA) due to adhesion of an injected fuel onto wall faces and a first-order lag element B (FOLEB) for compensating a model error of the (FTLEA). A fuel correction amount has a (FTLEA) compensation term and a (FOLEB) compensation term. By a compensation term for the (FTLEA), a first wall adhesion correction amount is obtained by multiplying a deviation between the wall face adhesion fuel amount (WFAFA) in a steady driving mode and a (WFAFA) at a present time with a first reference adaptation parameter and a first correction factor. By a compensation term for the (FOLEB), a second wall adhesion correction amount is obtained by multiplying a deviation between a required fuel amount of a present time and a required fuel amount of last time with a second reference adaptation parameter and a second correction factor.

11 Claims, 4 Drawing Sheets

FUEL INJECTION AMOUNT CONTROL SYSTEM FOR INTERNAL COMBUSTION ENGINE

CROSS REFERENCE TO RELATED APPLICATION

This application is based on and incorporates herein by reference Japanese Patent Application No. 2001-27813 filed on Feb. 5, 2001.

BACKGROUND OF THE INVENTION

1. Field of the Invention:

The present invention relates to a fuel injection control system for an internal combustion engine. More specifically, the invention relates to a fuel injection system for compensating fuel transportation lag, of a fuel transportation system, which transports fuel injected from a fuel injection valve to a cylinder of an internal combustion engine.

2. Related Background Art:

In many gasoline engines mounted on vehicles, a fuel injection valve is attached to an intake pipe and fuel (gasoline) is injected to an intake port. In the intake port injection of fuel, some of the fuel injected from the fuel injection valve is directly taken into a cylinder, but the rest of the fuel is adhered to the internal wall and associated parts of the intake port, and after that, the fuel gradually evaporates and is drawn into the cylinder. As an equation of modeling the behavior of the fuel in such a fuel transport system, the following Aquino equation is known:

$$MF(t)=(1-\Delta t/\tau)\cdot MF(t-\Delta t)+X\cdot GF(t-\Delta t)$$

where MF(t) is an amount of fuel adhered to the wall face at the present time t, $\Delta t$ is an operation cycle, $\tau$ is a fuel vaporization time constant, $MF(t-\Delta t)$ is an amount of fuel adhered to the wall face at the time of operation of last time, X is a fuel adhesion rate, and $GF(t-\Delta t)$ is a fuel injection amount at the time of operation of last time.

In JP-A No. 8-177556, it is proposed to calculate the fuel injection amount GF(t) by the following equation by using the amount MF of the fuel adhered to the wall face calculated by the above equation. GF(t) is calculated as follows:

$$GF(t)=GFET/(1-A\alpha)-A\alpha\cdot MF(t-\Delta t)$$

where GFET is a required fuel amount, and $A\alpha$ is obtained by sequentially multiplying an Aquino operator $\alpha$ ($=1-\Delta t/\tau$) calculated every sampling as shown by the following equation:

$$A\alpha=\alpha(t)\cdot\alpha(t-\Delta t)\cdot\alpha(t-2\Delta t)\cdot \ldots \cdot\alpha(t-n\Delta t)$$

In the fuel injection amount controlling method of the publication, each physical parameter such as the fuel vaporization time constant $\tau$, wall face adhesion rate X, and $A\alpha$ must be calculated using an arithmetic expression, a map, and/or the like. Consequently, the load on the CPU is high and the number of physical parameters to be calculated is large. This means that a number of adapting steps is required when the method is applied to an actual vehicle, and high development costs are a drawback.

SUMMARY OF THE INVENTION

At least one embodiment of the invention has been achieved in consideration of such circumstances and its object is to provide a fuel injection amount control system for an internal combustion engine. Further, the system will realize low development costs and facilitate actual adaptation of the system to a vehicle and also reduce a load on the CPU.

In order to achieve the object, according to at least one embodiment of the invention, there is provided a fuel injection amount control system for an internal combustion engine. The system compensates for a fuel transportation lag by using a fuel transportation lag model obtained by modeling a fuel transportation lag of a fuel transportation system that transports fuel injected from a fuel injection valve into a cylinder and associated intake system within an internal combustion engine. Additionally, physical parameters such as a fuel vaporization time constant, a wall face adhesion rate of an injected fuel, and the like are included in the fuel transportation lag model and converted to a small number of adaptation parameters. With such a configuration, the number of parameters to be computed is reduced, so that the number of adaptation steps for adapting the system to an actual vehicle, development costs, and the load on a CPU can all be reduced.

It is also possible to construct the adaptation parameters by a reference adaptation parameter and a correction factor, use a system identification value or a physical measurement value as the reference adaptation parameter, and correct a wall face adhesion correction amount obtained by using the reference adaptation parameter by the correction factor. For example, by adapting the correction factor in accordance with fluctuation of an air-fuel ratio, the fluctuation in the air-fuel ratio can be converged with a high response.

The fuel transportation lag model may contain a configuration such that a fuel transportation lag element A, due to adhesion of the injected fuel onto the wall face, and a first-order lag element B, for compensating a model error of the fuel transportation lag element A, are coupled in series. Fluctuations in the air-fuel ratio at the time of acceleration/deceleration are caused not only by the fuel transportation lag due to the adhesion of the injected fuel to the wall face, but also factors such as an error in measurement (estimation) of an air volume charged in a cylinder. The error in measurement (estimation) of the cylinder charging air volume can be approximated by the first-order lag of the fuel transportation lag. Consequently, by coupling the first-order lag element B to the fuel transportation lag element A in series, the model error due to the error in measurement (estimation) of the cylinder charging air volume or the like can be compensated, so that accuracy in computing the fuel correction amount can be improved.

An equation for computing a fuel correction amount by using the fuel transportation lag model may be constructed using a compensation term for the fuel transportation lag element A and a compensation term for the first-order lag element B. With the configuration, the computation equation of the fuel correction amount is simplified to two compensation terms. It further facilitates the adaptation to an actual vehicle.

In this case, in a compensation term for the fuel transportation lag, a first wall face adhesion correction amount may be obtained. This is done by multiplying a deviation between the wall face adhesion fuel amount in a steady driving mode and a wall face adhesion fuel amount at a present time, a deviation between a present intake manifold pressure and a smoothed intake manifold pressure, or a deviation between a present intake air volume and a smoothed intake air volume with a first reference adaptation parameter and a first correction factor. With the configuration, the first wall face adhesion correction amount for compensating the fuel transportation lag can be computed with a high degree of accuracy by a simple arithmetic operation.

Duration of the first wall face adhesion correction amount may be expressed by a function of the fuel vaporization time constant. Thus, the duration of the first wall face adhesion correction amount can be properly set in accordance with the evaporation characteristics of the fuel adhered on the wall face.

In a compensation term for the first-order lag element B, a second wall adhesion correction amount may be obtained in two ways. First, by multiplying a deviation between a required fuel amount of the present time and a required fuel amount of the previous time, or secondly, by multiplying a deviation between an intake manifold pressure of this time and an intake manifold pressure of last time, with a second reference adaptation parameter and a second correction factor. With the configuration, the second wall face adhesion correction amount for absorbing the model error can be accurately computed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PREFERRED EMBODIMENTS

Figure 1:
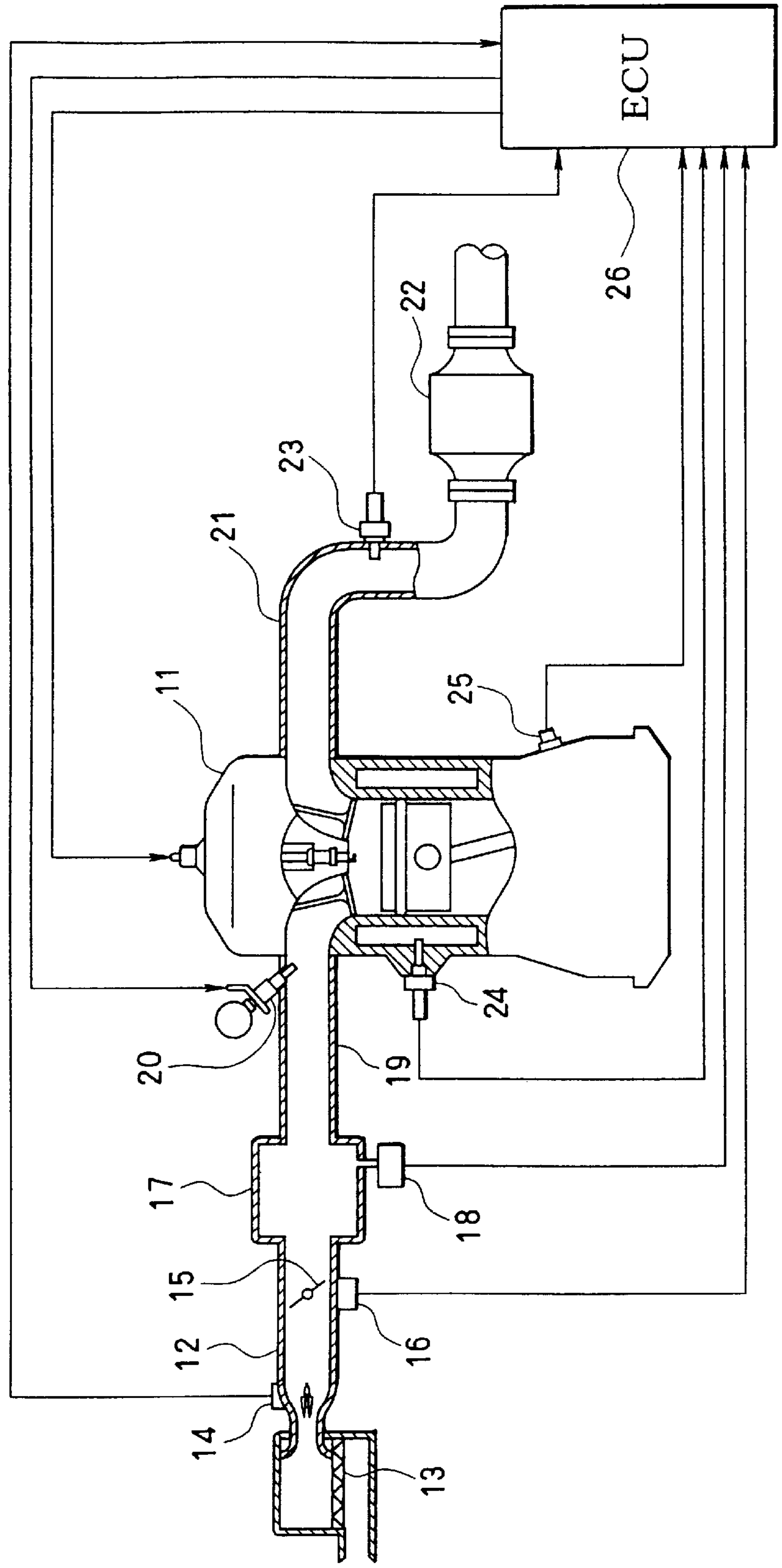
FIG. 1 is a schematic configuration diagram of an entire engine control system as a first embodiment of the invention.

The following description of preferred embodiment(s) is merely exemplary in nature and is in no way intended to limit the invention, its application, or uses.

A first embodiment of the invention will be described below with reference to FIGS. 1 through 4. First, the schematic configuration of an entire engine control system will be described by referring to FIG. 1. In the uppermost stream portion of an intake pipe 12 of internal combustion engine 11, an air cleaner 13 is provided. On the downstream side of the air cleaner 13, an air flow meter 14 for detecting an intake air volume is provided. On the downstream side of the air flow meter 14, a throttle valve 15 and a throttle angle sensor 16, for sensing a throttle angle, are provided. A surge tank 17 is provided downstream of the throttle valve 15, and the surge tank 17 is provided with an intake manifold pressure sensor 18 for sensing an intake manifold pressure Pm. The surge tank 17 is also provided with an intake manifold 19 for introducing air into all cylinders of the internal combustion engine 11. A fuel injection valve 20, for injecting fuel, is attached near the intake port of the intake manifold 19 of each cylinder.

At some point within the length of an exhaust pipe 21 of the engine 11, a catalyst 22 is disposed. The catalyst 22 may be a three-way catalyst for reducing CO, HC, NOx, and the like, in an exhaust gas. On the upstream side of the catalyst 22, an air-fuel ratio sensor 23 is provided for sensing the air-fuel ratio or a rich/lean state of the exhaust gas. To a cylinder block of the engine 11, a cooling water temperature sensor 24 for sensing a cooling water temperature Thw and a crank angle sensor 25 for sensing engine speed Ne are attached.

Outputs of the sensors are input to an engine control unit (described below as "ECU") 26. The ECU 26 is constructed by using a microcomputer as a main body. The ECU 26 calculates a fuel correction amount WETC for compensating a fuel transportation lag of a fuel transportation system. The fuel transportation system transports the fuel injected from the fuel injection valve 20 to each cylinder by executing a fuel correction amount computing program of FIG. 2 stored in a built-in ROM (storage medium). A required fuel amount GFET is corrected by the fuel correction amount WETC, thereby obtaining a final fuel injection amount GF (injection time). Fuel injection is executed by applying an injection signal having a pulse width according to the fuel injection amount GF to the fuel injection valve 20 at the time of each injection.

Figure 3:
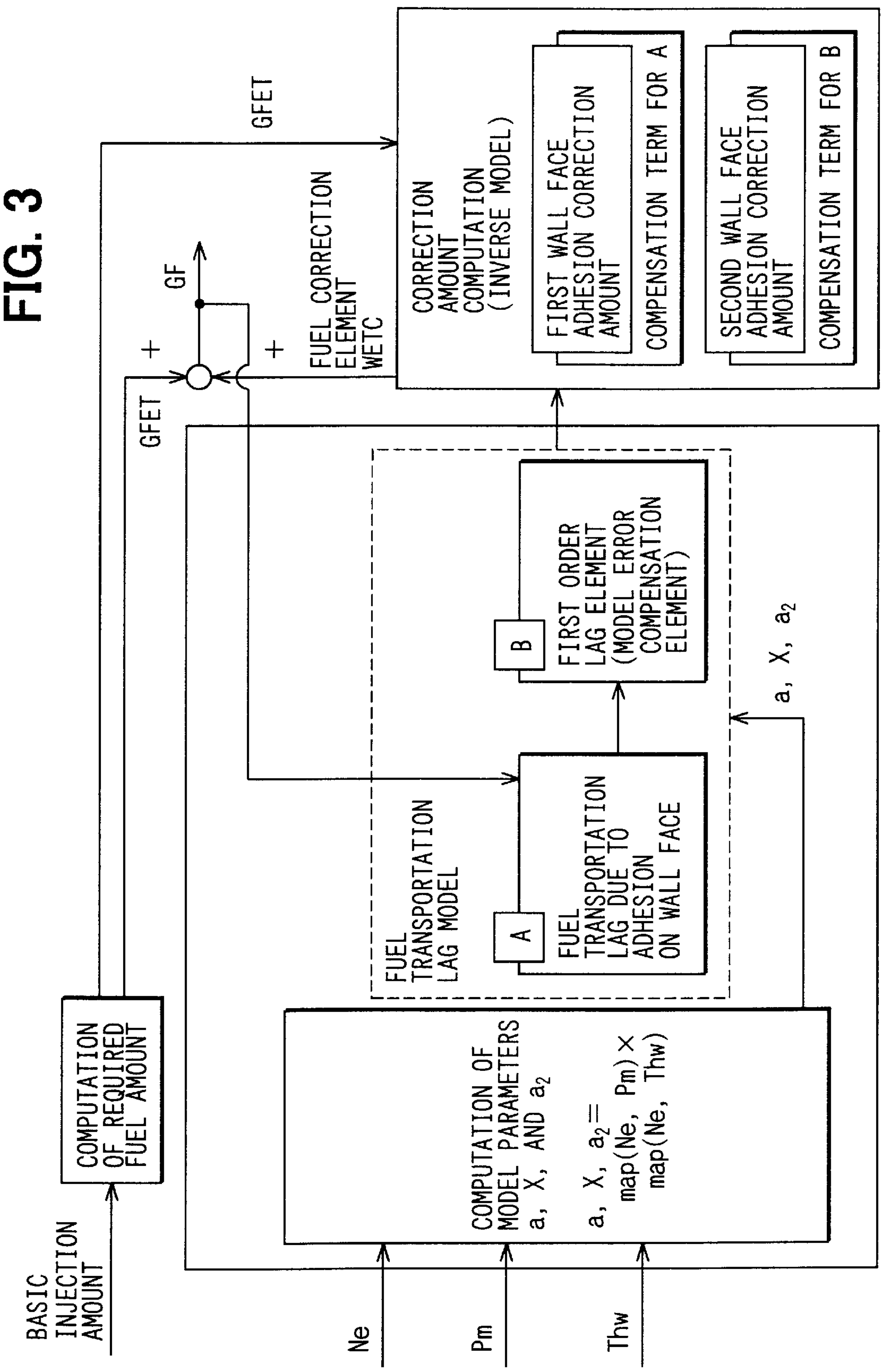
FIG. 3 is a block diagram schematically showing a system for compensating a fuel transportation lag.
Figure 4:
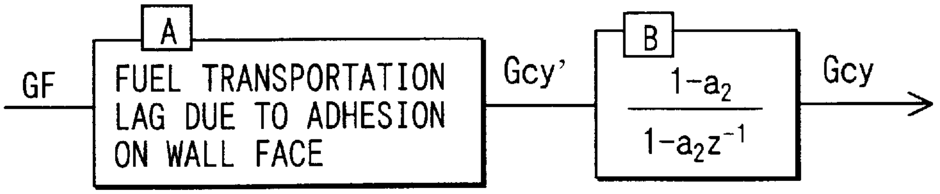
FIG. 4 is a block diagram showing a first embodiment of a fuel transportation lag model.

A method of computing the fuel correction amount WETC from the fuel transportation lag model will now be described by referring to FIG. 3. The fuel transportation lag model has a configuration such that a fuel transportation lag element A, due to adhesion of the injected fuel on the wall face of the intake port and associated parts, and a first-order lag element B, for compensating a model error of the fuel transportation lag element A, are coupled in series. Fluctuations in the air-fuel ratio at the time of acceleration/deceleration are caused not only by the fuel transportation lag due to the adhesion of the injected fuel to the wall face, but also by factors such as an error in measurement (estimation) of an air volume charged in a cylinder. The error in measurement (estimation) of the cylinder charging air volume can be approximated by the first-order lag of the fuel transportation lag. Consequently, as shown in FIGS. 3 and 4, by coupling the first-order lag element B to the fuel transportation lag element A, in series, the model error due to the error in measurement (estimation) of the cylinder charging air volume or the like can be compensated, so that the accuracy in calculating the fuel correction amount WETC can be improved.

The fuel transportation lag element A is expressed by the following Aquino equation:

$$MF(t)=(1-\Delta t/\tau)\cdot MF(t-\Delta t)+X\cdot GF(t-\Delta t)$$

where MF(t) is an amount of fuel adhered to the wall face at the present time t, $\Delta t$ is an operation cycle, $\tau$ is a fuel vaporization time constant, $MF(t-\Delta t)$ is an amount of fuel adhered to the wall face at the time of operation of last time, X is a fuel adhesion rate, and $GF(t-\Delta t)$ is a fuel injection amount of operation of last time.

A fuel amount Gcy' (an output of the fuel transportation lag element A) drawn into a cylinder, which is calculated from Aquino's equation, is expressed by the following equation:

$$Gcy' = (1-X)\cdot GF + (1-a)\cdot MF \qquad (1)$$

where "a" is a fuel residual rate, a-1−Δt/τ,(1−X)·GF denotes an amount of fuel which is directly drawn into a cylinder without being adhered to the wall face, and (1−a)·MF is an amount of fuel which evaporates from the wall face and is drawn into the cylinder.

The amount Gcy of fuel taken into the cylinder after model error compensation (output of the first-order lag element B) is expressed by the following equation:

$$Gcy = Gcy' + a_2\{Gcy(t-\Delta t) - Gcy'\} \qquad (2)$$

where $a_2=1-\Delta t/\tau_2$ ($\tau_2$ is a time constant of the first-order lag element B)

When the equation (1) is substituted into equation (2), the following equation is derived:

$$Gcy = (1-X)\cdot GF\cdot(1-a_2) + (1-a)\cdot MF\cdot(1-a_2) + a_2\cdot Gcy(t-\Delta t) \qquad (3)$$

When Gcy=GFET and Gcy(t−Δt)=GFET(t−Δt), the following equation is obtained.

[Equation 1]

$$GF = \frac{GFET}{(1-X)(1-a_2)} - \frac{1-a}{1-X}\cdot MF - \frac{a_2}{(1-X)(1-a_2)}\cdot GFET(t-\Delta t) \qquad (4)$$

The final fuel injection amount GF is calculated by adding the fuel correction amount WETC to the required fuel amount GFET.

$$GF = GFET + WETC \qquad (5)$$

When the equation (5) is substituted for GF in equation (4) to solve for the fuel correction amount WETC, the following equation is obtained:

[Equation 2]

$$\begin{aligned} WETC &= \left\{\frac{1}{(1-X)(1-a_2)} - 1\right\}\cdot GFET - \frac{1-a}{1-X}\cdot MF - \frac{a_2}{(1-X)(1-a_2)}\cdot GFET(t-\Delta t) \\ &= \frac{X}{1-X} + \frac{a_2}{(1-X)(1-a_2)}\cdot GFET - \frac{1-a}{1-X}\cdot MF - \frac{a_2}{(1-X)(1-a_2)}\cdot GFET(t-\Delta t) \\ &= \frac{1-a}{1-X}\cdot(MFstable - MF) + \frac{1}{1-X}\cdot\frac{a_2}{1-a_2}\cdot\{GFET - GFET(t-\Delta t)\} \end{aligned} \qquad (6)$$

where, MFstable denotes a cylinder wall face adhered fuel amount which is an amount of fuel stably adhered to the inner wall face of the intake system in a steady driving mode. In the steady driving mode, MF(t)=MF(t−Δt)=MFstable, GF(t)=GF(t−Δt), and Gcy'=Gcy=Gy. Consequently, the following equation is obtained from equation (1).

[Equation 3]

$$MFstable = \frac{X}{1-a}\cdot GF \qquad (7)$$

When the parameter (1−a)/(1−X) in the first term of the equation (6) is set as a first reference adaptation parameter $b_1$ and the parameter $1/(1-X)\cdot a_2/(1-a_2)$ is set as a second reference adaptation parameter $b_2$, the fuel correction amount WETC is calculated by the following equation.

$$WETC = b_1\cdot(MFstable - MF) + b_2\cdot\{GFET - GFET(t-\Delta t)\} \qquad (8)$$

In the above equation, $b_1$·(MFstable−MF) of the first term is a compensation term for the fuel transportation lag element A (calculation term of the first wall face adhesion correction amount), and $b_2$·{GFET−GFET(t−Δt)} of the second term is a compensation term (calculation term of the second wall face adhesion correction amount) for the first-order lag element B. Further, in order to facilitate adaptation to an actual vehicle, it is sufficient to calculate the fuel correction amount WETC by the following equation in which the first and second terms are multiplied by a first correction factor $k_1$ and a second correction factor $K_2$, respectively, as shown in:

$$WETC = b_1\cdot k_1\cdot(MF\text{stable} - MF) + b_2\cdot k_2\cdot\{GFET - GFET(t-\Delta t)\} \qquad (9)$$

By the above equation, the first wall face adhesion correction amount is obtained by multiplying the deviation between the wall face adhesion fuel amount MFstable in the steady driving mode and the wall face adhesion fuel amount MF at the present time by the first reference adaptation parameter $b_1$ and the first correction factor $k_1$. Duration of the first wall face adhesion correction amount may be expressed by a function of the fuel evaporation time constant τ. The second wall face adhesion correction amount is obtained by multiplying the deviation between the required fuel amount GFET of this time and the required fuel amount GFET(t−Δt) of the last time by the second reference adaptation parameter $b_2$ and the second correction factor $k_2$.

The adaptation parameters (reference adaptation parameters $b_1$ and $b_2$ and correction factors $k_1$ and $k_2$) may be adapted by one of the following methods (a) and (b).

(a) By setting each of the correction factors $k_1$ and $k_2$ to 1, the reference adaptation parameters $b_1$ and $b_2$ are adapted from a map or the like in accordance with the fluctuations in the air-fuel ratio.

(b) By using a system identification value or a physical measurement value as each of the reference adaptation parameters $b_1$ and $b_2$ the correction factors $k_1$ and $k_2$ are adapted from a map or the like in accordance with fluctuations in the air-fuel ratio.

Figure 2:
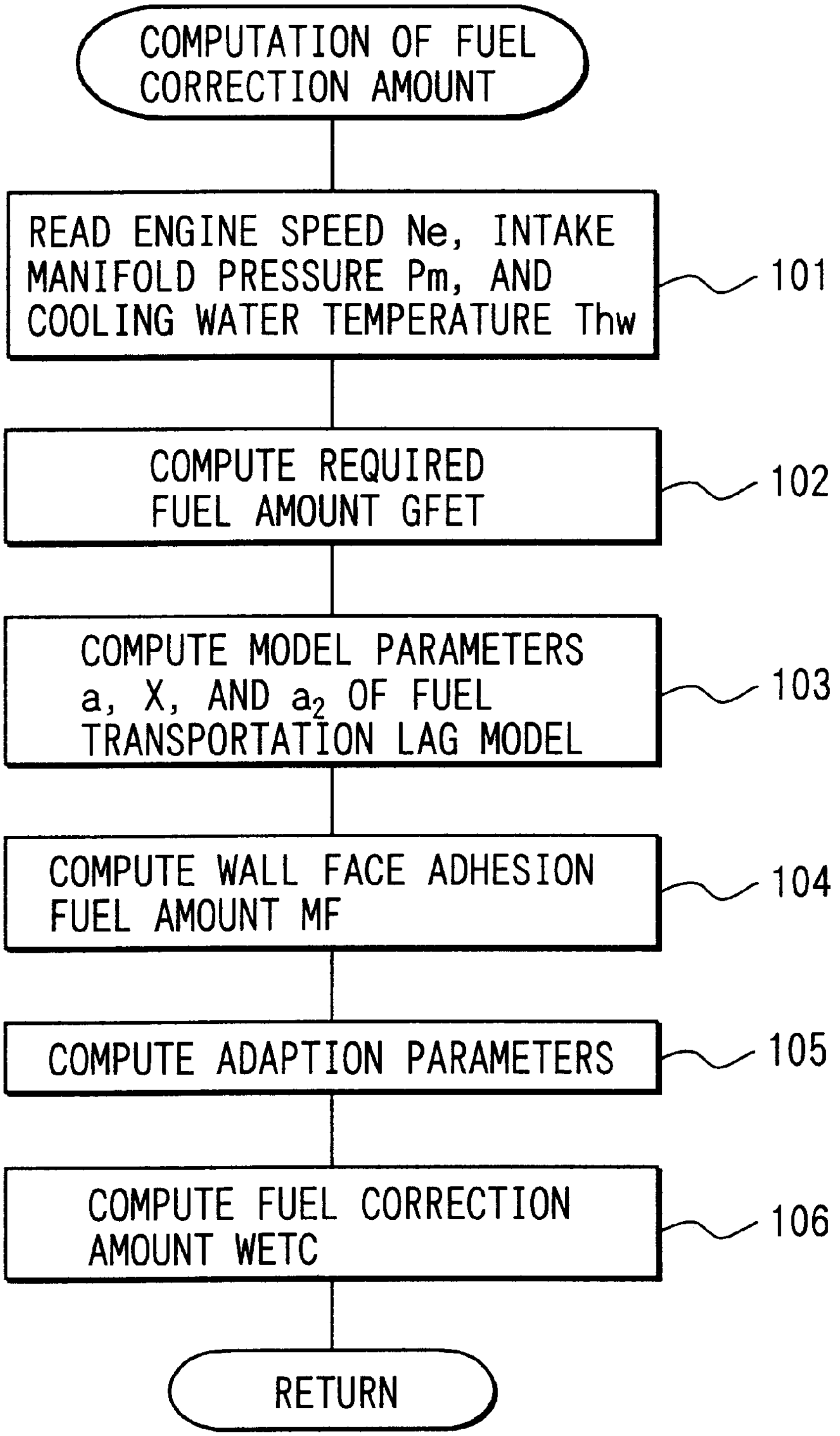
FIG. 2 is a flowchart showing the flow processes of a fuel correction amount computing program.

The details of the processes of the fuel correction amount computing program of FIG. 2 will now be described. The program is executed periodically and synchronously with an injection timing of each cylinder. When the program is started, first, in step 101, the engine speed Ne, intake manifold pressure Pm, and cooling water temperature Thw (temperature information in place of the wall face temperature of the intake manifold 19) detected by the sensors 25, 18, and 24, respectively, are read. In step 102, the required fuel amount GFET is calculated by the following equation:

*GFET*=basic injection amount×air-fuel ratio learn value ×(after-start increase amount factor +OTP increase amount factor)

where required fuel amount GFET is an amount of fuel to be drawn into the cylinder in the steady driving mode. The basic injection amount is obtained from a map or the like in accordance with engine operation parameters such as the engine speed Ne and intake manifold pressure Pm. The air-fuel ratio learn value is a learn value for correcting a deviation of the air-fuel ratio due to a change in time or the like. The after-start increase amount factor is a fuel correction factor for correcting cylinder wetting which occurs immediately after starting and the like, and the OTP increase amount factor is a fuel correction factor for correcting the injection amount so as to be increased to protect the catalyst 22 and the like at the time of high load.

After computing the required fuel amount GFET, the program advances to step 103 where model parameters a, X, and $a_2$ of the fuel transportation lag model are calculated by the following equations using two-dimensional maps map11 through map32:

$$a = \text{map}\mathbf{11}(Ne,\ Pm) \times \text{map}\mathbf{12}(Ne,\ Thw)$$

$$X = \text{map}\mathbf{21}(Ne,\ Pm) \times \text{map}\mathbf{22}(Ne,\ Thw)$$

$$a_2 = \text{map}\mathbf{31}(Ne,\ Pm) \times \text{map}\mathbf{32}(Ne,\ Thw)$$

where, each of map11(Ne, Pm), map21(Ne, Pm), and map31 (Ne, Pm) is a two-dimensional map using the engine speed Ne and the intake manifold pressure Pm as variables, and each of map12(Ne, Thw), map22(Ne, Thw), and map32(Ne, Thw) is a two-dimensional map using the engine speed Ne and the cooling water temperature Thw as variables. In this case, $a=1-\Delta t/\tau$ (where $\tau$ denotes a fuel vaporization time constant) and $a_2=1-\Delta t/\tau_2$ (where $\tau_2$ is a time constant of the first-order lag element B).

In this case, in order to satisfy the relation that the wall face adhesion fuel amount MFstable in the steady driving mode is almost proportional to the intake manifold pressure Pm and hardly changes with the engine speed Ne also in the case where the wall face temperature (cooling water temperature Thw) of the intake manifold 19 is low, the correction term by the wall face temperature (cooling water temperature Thw) has to be made variable also with the engine speed Ne. For this purpose, in the first embodiment, the correction term by the wall face temperature (cooling water temperature Thw) is calculated from two-dimensional maps map12(Ne, Thw), map22(Ne, Thw), and map32(Ne, Thw) using the engine speed Ne and the cooling water temperature Thw as variables.

After computing the model parameters a, X, and $a_2$, the program advances to step 104 where the wall face adhesion fuel amount MF is calculated by the following equation:

$$MF(t) = (1-t/\tau)\cdot MF(t-\Delta t) + X\cdot GF(t-\Delta t)$$

where MF(t) is an amount of fuel adhered to the wall face at a time t, $\Delta t$ is an operation period (for example, interval of injections of each cylinder), $\tau$ is fuel vaporization time constant, MF(t−Δt) is an amount of fuel adhered to the wall face at the time of operation of last time, and GF(t−Δt) is a fuel injection amount of operation of last time. When the operation cycle At is set to an injection interval (720° CA) of each cylinder, MF(t−Δt) is a wall face adhesion fuel amount before 720° CA, and GA(t−Δt) is a fuel injection amount before 720° CA.

After that, the program advances to step 105 where the adaptation parameters (reference adaptation parameters $b_1$ and $b_2$ and correction factors $k_1$ and $k_2$) are adapted by any of the following methods (a) and (b).

(a) By setting each of the correction factors $k_1$ and $k_2$ to 1, the reference adaptation parameters $b_1$, and $b_2$ are adapted from a map or the like in accordance with a fluctuation in the air-fuel ratio.

(b) By using a system identification value or a physical measurement value as each of the reference adaptation parameters $b_1$ and $b_2$, the correction factors $k_1$ and $k_2$ are adapted from a map or the like in accordance with a fluctuation in the air-fuel ratio.

After that, the program advances to step 106 where the fuel correction amount WETC is calculated by the following equation using the reference adaptation parameters $b_1$ and $b_2$ and correction factors $k_1$ and $k_2$.

$$WETC = b_1\cdot k_1\cdot(MF\text{stable}-MF) + b_2\cdot k_2\cdot\{GFET-GFET(t-\Delta t)\}$$

According to the foregoing first embodiment, the fuel correction amount WETC can be calculated by the small number of adaptation parameters (reference adaptation parameters $b_1$ and $b_2$ and correction factors $k_1$ and $k_2$) and the number of adaptation steps for adapting the system to an actual vehicle can be made small. Therefore, a low development cost can be achieved, the operating process can be simplified, and the load on the CPU can also be reduced.

In the first embodiment, in the compensation term for the fuel transportation lag element A, the first wall face adhesion correction amount is obtained by multiplying the deviation between the wall face adhesion fuel amount MFstable in the steady driving mode and the wall face adhesion fuel amount MF at a present time by the first reference adaptation parameter $b_1$ and the first correction factor $k_1$. However, in place of the deviation between the wall face adhesion fuel amount MFstable in the steady driving mode and the wall face adhesion fuel amount MF at a present time, a deviation between a present intake manifold pressure and a smoothed intake manifold pressure (obtained by lagging the intake manifold pressure by the fuel vaporization time constant $\tau$ so as to have a first-order lag), or a deviation between a present intake air volume and a smoothed intake air volume (obtained by lagging the intake air volume by the fuel vaporization time constant $\tau$ so as to have a first-order lag) may be used.

In the first embodiment, in the compensation term for the first-order lag element B, the second wall face adhesion correction amount is obtained by multiplying the deviation between the required fuel amount GFET of a present time and the required fuel amount GFET(t−Δt) of last time by the second reference adaptation parameter $b_2$ and the second correction factor $k_2$. However, in place of the deviation between the required fuel amount GFET of a present time and the required fuel amount GFET(t−Δt) of last time, a deviation between an intake manifold pressure of this time and an intake manifold pressure of last time may be used.

The operation cycle Δt is not limited to the injection interval (720° CA) of each cylinder but may be set to a cycle other than the injection interval.

Figure 5:
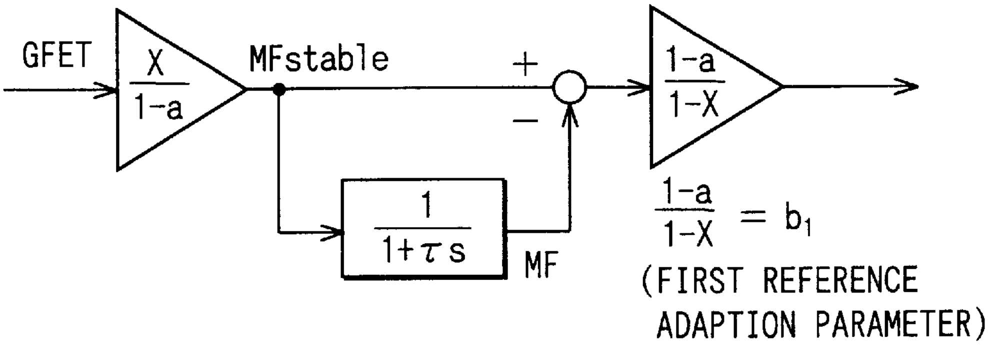
FIG. 5 is a block diagram showing a fuel transportation lag model of a second embodiment.

In a second embodiment of a fuel transportation lag model of FIG. 5, the relation between the wall face adhesion fuel amount MFstable in the steady driving mode and the required fuel amount GFET is approximated by the following equation:

$$MFstable = \frac{X}{1-a}\cdot GFET \tag{7}$$

GFET in the above equation is approximate to GF in Equation 7.

The wall face adhesion fuel amount MF at a present time is obtained by lagging the wall face adhesion fuel amount MFstable in the steady driving mode by the fuel vaporization time constant $\tau$ so as to have a first-order lag. By multiplying the deviation between the wall face adhesion fuel amount MFstable in the steady driving mode and the wall face adhesion fuel amount MF at the present time by the first reference adaptation parameter b1=(1−a)/(1−X), the first wall face adhesion correction amount equals (MFstable−MF)×$b_1$.

Figure 6:
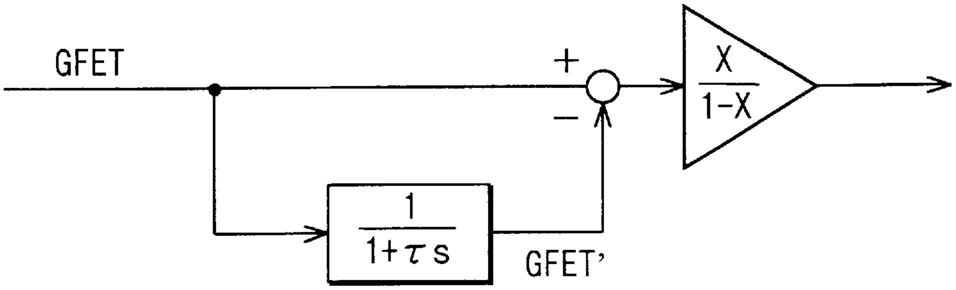
FIG. 6 is a block diagram showing a fuel transportation lag model of a third embodiment.

In a third embodiment, a fuel transportation lag model of FIG. 6 is obtained by multiplying the first reference adaptation parameter $b_1$, with the parameter X/(1−a) for converting the required fuel amount GFET into the wall face adhesion fuel amount MFstable in the steady driving mode so that the parameters are integrated to a single adaptation parameter X/(1−X). Therefore, in the fuel transportation lag mode of FIG. 6, the deviation between the required fuel amount GFET and the value GFET', obtained by lagging the required fuel amount GFET by the fuel vaporization time constant τ so as to have a first-order lag, is multiplied by the adaptation parameter X/(1−X), thereby obtaining the first wall face adhesion correction amount equal to (GFET−GFET')·X/(1−X).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel injection amount control system for an internal combustion engine, comprising a compensation term for compensating a fuel transportation lag by using a fuel transportation lag model obtained by modeling a fuel transportation lag of a fuel transportation system for transporting a fuel injected from a fuel injection valve into an intake system so as to be taken into a cylinder of an internal combustion engine, wherein physical parameters including at least one of a fuel vaporization time constant and a wall face adhesion rate of an injected fuel, included in the fuel transportation lag model, are converted to adaptation parameters; and the adaptation parameters include a reference adaptation parameter and a correction factor, and one of a system identification value and a physical measurement value is used as the reference adaptation parameter, and a wall face adhesion correction amount, obtained by using the reference adaptation parameter, is corrected by the correction factor.

2. The fuel injection amount control system for an internal combustion engine according to claim 1, wherein the fuel transportation lag model has a configuration that a fuel transportation lag element A due to adhesion of the injected fuel onto the wall face and a first-order lag element B, for compensating a model error of the fuel transportation lag element A, are coupled in series.

3. The fuel injection amount control system for an internal combustion engine according to claim 2, wherein an equation for computing a fuel correction amount by using the fuel transportation lag model includes a compensation term for the fuel transportation lag element A and a compensation term for the first-order lag element B.

4. The fuel injection amount control system for an internal combustion engine according to claim 3, wherein in a compensation term for the first-order lag element B, a second wall adhesion correction amount is obtained by multiplying one of a deviation between a required fuel amount of a present time and a required fuel amount of last time and a deviation between an intake manifold pressure of a present time and an intake manifold pressure of last time with a second reference adaptation parameter and a second correction factor.

5. A fuel injection amount control system for an internal combustion engine, comprising a compensation term for compensating a fuel transportation lag by using a fuel transportation lag model obtained by modeling a fuel transportation lag of a fuel transportation system for transporting a fuel injected from a fuel injection valve into an intake system so as to be taken into a cylinder of an internal combustion engine, wherein physical parameters including at least one of a fuel vaporization time constant and a wall face adhesion rate of an injected fuel, included in the fuel transportation lag model, are converted to adaptation parameters; and the fuel transportation lag model has a configuration that a fuel transportation lag element A due to adhesion of the injected fuel onto the wall face and a first-order lag element B, for compensating a model error of the fuel transportation lag element A, are coupled in series.

6. The fuel injection amount control system for an internal combustion engine according to claim 5, wherein an equation for computing a fuel correction amount by using the fuel transportation lag model includes a compensation term for the fuel transportation lag element A and a compensation term for the first-order lag element B.

7. The fuel injection amount control system for an internal combustion engine according to claim 6, wherein in a compensation term for the first-order lag element B, a second wall adhesion correction amount is obtained by multiplying one of a deviation between a required fuel amount of a present time and a required fuel amount of last time and a deviation between an intake manifold pressure of a present time and an intake manifold pressure of last time with a second reference adaptation parameter and a second correction factor.

8. A fuel injection amount control system for an internal combustion engine, comprising a compensation term for compensating a fuel transportation lag by using a fuel transportation lag model obtained by modeling a fuel transportation lag of a fuel transportation system for transporting a fuel injected from a fuel injection valve into an intake system so as to be taken into a cylinder of an internal combustion engine, wherein physical parameters including at least one of a fuel vaporization time constant and a wall face adhesion rate of an injected fuel, included in the fuel transportation lag model, are converted to adaptation parameters; and in a compensation term for the fuel transportation lag, a first wall face adhesion correction amount is obtained by multiplying one of a deviation between a wall face adhesion fuel amount in a steady driving mode and a wall face adhesion fuel amount at a present time, a deviation between a present intake manifold pressure and a smoothed intake manifold pressure, and a deviation between a present intake air volume and a smoothed intake air volume with a first reference adaptation parameter and a first correction factor.

9. The fuel injection amount control system for an internal combustion engine according to claim 8, wherein duration of the first wall face adhesion correction amount is expressed by a function of the fuel vaporization time constant.

10. The fuel injection amount control system for an internal combustion engine according to claim 9, wherein in a compensation term for a first-order lag element B, a second wall adhesion correction amount is obtained by multiplying one of a deviation between a required fuel amount of this time and a required fuel amount of last time and a deviation between an intake manifold pressure of this time and an intake manifold pressure of last time with a second reference adaptation parameter and a second correction factor.

11. The fuel injection amount control system for an internal combustion engine according to claim 8, wherein in a compensation term for a first-order lag element B, a second wall adhesion correction amount is obtained by multiplying one of a deviation between a required fuel amount of a present time and a required fuel amount of last time and a deviation between an intake manifold pressure of a present time and an intake manifold pressure of last time with a second reference adaptation parameter and a second correction factor.

* * * * *